US012747810B2

(12) United States Patent
Krivanek et al.

(10) Patent No.: US 12,747,810 B2
(45) Date of Patent: Sep. 29, 2026

(54) SYSTEM AND METHOD FOR FORMING A FULL ENGAGEMENT MALE LOCK IN A DUCTLINE

(71) Applicant: Mestek Machinery, Inc., Westfield, MA (US)

(72) Inventors: David Krivanek, Cedar Rapids, IA (US); Timothy Aaron Coon, Lisbon, IA (US)

(73) Assignee: Mestek Machinery, Inc., Westfield, MA (US)

( * ) Notice: Subject to any disclaimer, the term of this patent is extended or adjusted under 35 U.S.C. 154(b) by 211 days.

(21) Appl. No.: 18/806,008

(22) Filed: Aug. 15, 2024

(65) Prior Publication Data

US 2024/0401726 A1 Dec. 5, 2024

Related U.S. Application Data

(62) Division of application No. 17/359,942, filed on Jun. 28, 2021, now Pat. No. 12,565,947.

(60) Provisional application No. 62/705,571, filed on Jul. 6, 2020.

(51) Int. Cl.

| | |
|---|---|
| ***F16L 13/14*** | (2006.01) |
| ***B21D 19/00*** | (2006.01) |
| ***B21D 39/02*** | (2006.01) |
| ***F16L 23/14*** | (2006.01) |

(52) U.S. Cl.

CPC .............. *F16L 13/14* (2013.01); *B21D 19/00* (2013.01); *B21D 39/02* (2013.01); *B21D 39/023* (2013.01); *F16L 23/14* (2013.01)

(58) Field of Classification Search

CPC ...... B21D 19/00; B21D 39/02; B21D 39/023; F16L 13/14; F16L 13/141; F16L 23/14

See application file for complete search history.

(56) References Cited

U.S. PATENT DOCUMENTS

| | | | | |
|---|---|---|---|---|
| 5,105,640 A * | 4/1992 | Moore | B21D 39/02 | 72/306 |
| 8,171,766 B1 * | 5/2012 | Slavik | B21D 39/02 | 72/182 |
| 2004/0143954 A1 * | 7/2004 | Walsh | B21C 37/06 | 29/430 |
| 2010/0077822 A1 * | 4/2010 | Borwig | F24F 13/0209 | 138/177 |
| 2014/0202225 A1 * | 7/2014 | Runyan | B21D 5/015 | 72/372 |
| 2018/0142916 A1 * | 5/2018 | Kerska | B23K 10/00 | |

FOREIGN PATENT DOCUMENTS

| | | | |
|---|---|---|---|
| WO | WO-2014145616 A1 * | 9/2014 | B21D 39/02 |
| WO | WO-2014145737 A1 * | 9/2014 | B01F 23/2363 |

* cited by examiner

*Primary Examiner* — Bobby Yeonjin Kim

(74) *Attorney, Agent, or Firm* — Grogan, Tuccillo & Vanderleeden LLP

(57) ABSTRACT

The present invention provides a method for producing a full engagement Pittsburgh male lock using specific cutting assemblies and protocols that reduce the amount of metal that is removed from the male portion of the corner notches in the duct. Forming of the male portion of the lock is done after the connecting flange forming has been completed as opposed to before the connecting flange forming has been completed.

1 Claim, 3 Drawing Sheets

SYSTEM AND METHOD FOR FORMING A FULL ENGAGEMENT MALE LOCK IN A DUCTLINE

CROSS-REFERENCE TO RELATED APPLICATIONS

This application is a divisional application of U.S. patent application Ser. No. 17/359,942, filed Jun. 28, 2021, which claims the benefit of U.S. Provisional Application Ser. No. 62/705,571, filed on Jul. 6, 2020, both of which are hereby incorporated by reference in their entirety.

FIELD OF THE INVENTION

The present invention relates, generally, to a duct seam lock system and method and, in particular, to a duct seam lock system and method that results in a full engagement Pittsburgh male lock from end to end of a duct that is being formed with this particular metal duct forming apparatus.

BACKGROUND OF THE INVENTION

Apparatuses that are able to process a metal blank into one of any number of different shapes and configurations, via the application of cutting and bending assemblies, are generally known in the metal formation arts.

One application of known metal formation apparatuses is in the manufacture of metal ducts, most commonly rectangular metal ducts, from a metal blank. These known metal formation apparatuses typically use rollers and various cutting implements to create the base structure of the duct. Opposing lateral edges of the incomplete duct are shaped into matching seam halves that can be thereafter manipulated and integrated with one another to form a completed and sealed duct.

Metal ducts are commonly formed from different gauges of sheet metal in sections of predetermined length. These sections are then connected to form a continuous duct of desired length for typical use distributing air or other gasses. Each section of duct is typically formed either by bending two pieces of sheet metal of the desired length at a 90° angle or by bending one piece of sheet metal of the desired length utilizing three 90° angles. The edges of the piece(s) are joined together forming what is commonly known as a seam. In either a "Pittsburgh" type seam or a "Snap Lock" type seam one edge of each sheet metal piece is formed with a longitudinally extending groove to form the female portion of the joint while the other edge is bent over along its length to form the male portion of the joint. Then, either the two pieces with one 90° bend each are assembled together by inserting the male portion of each part into the female portion, or the one piece with three 90° bends is assembled by inserting the male portion on one edge of the part into the female portion of the other edge of the part. This process leaves an edge extending beyond the joint(s) from the female portion. The extending edge will then be bent over to lock the seam.

It is therefore one object of the present invention to provide a system and method for producing a full engagement Pittsburgh male lock that will substantially reduce the amount of manual labor required to remove the air leakage that can occur in a completed duct section.

SUMMARY OF THE INVENTION

It is an object of the present invention to provide metal forming system and apparatus.

It is another object of the present invention to provide a corner cutting assembly using the metal forming system and apparatus.

It is another object of the present invention to provide a method for producing a full engagement Pittsburgh male lock using specific cutting assemblies that reduce the amount of metal that is removed from the male portion of the corner notches in the duct.

According to another object of the present invention, the forming of the male portion of the lock is being done after the connecting flange forming has been completed as opposed to before the connecting flange forming has been completed.

These and other objects are achieved by the present invention.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
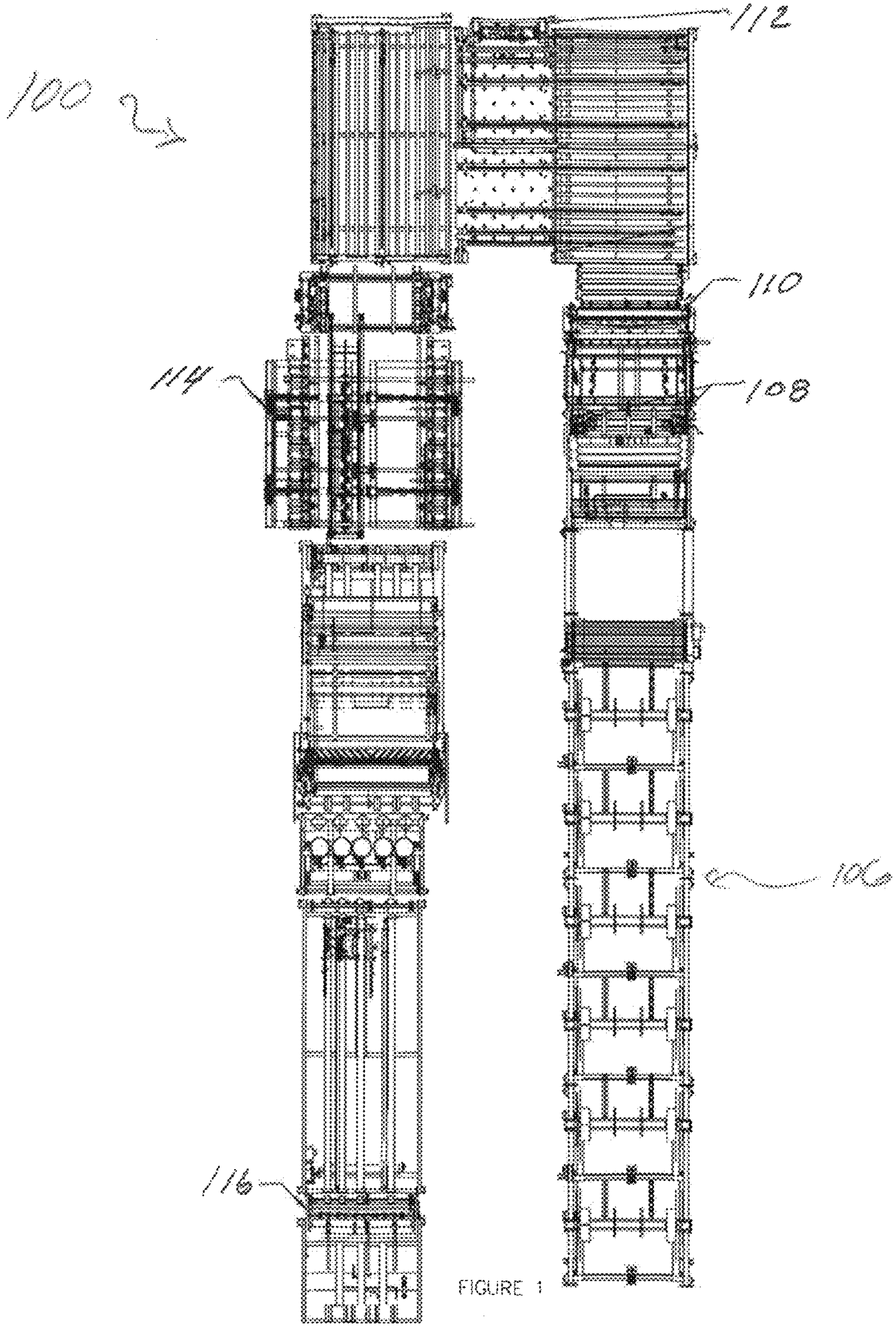
FIG. 1 illustrates one top plan view of metal forming apparatus according to an embodiment of the present invention.

With reference to FIG. 1, a top plan view of a metal forming system/apparatus 100 according to an embodiment of the present invention is illustrated. As disclosed in detail hereinafter, the metal forming apparatus 100 has been altered from known assemblies so as to produce a differently shaped corner cutting assembly (e.g., a differently-shaped and machined blank), for subsequent forming into HVAC duct constructions, or the like.

Figure 2:
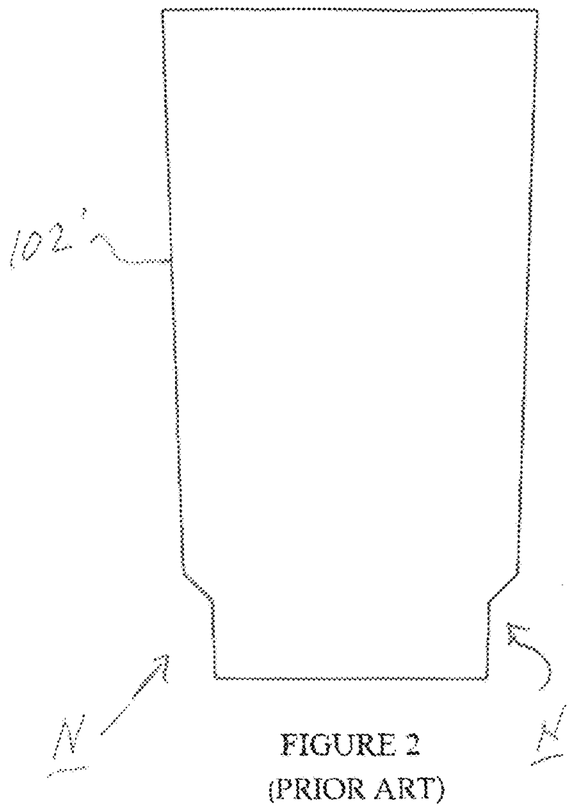
FIGURE 2 (PRIOR ART)
FIG. 2 illustrates a prior art corner cutting assembly shape.
Figure 3:
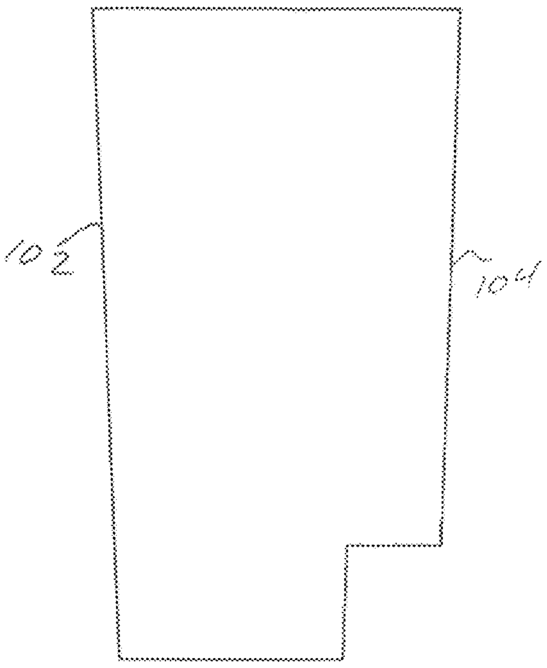
FIG. 3 illustrates the corner cutting assembly shape according to an embodiment of the present invention.

In particular, and as shown in FIG. 3, the shape of the corner cutting assemblies have been altered as compared to those that have been produced using a conventional apparatus, such as is shown in FIG. 2. As best seen by a comparison between FIGS. 2 and 3, the shape of the corner notches, N, have been altered in two respects. First, as best seen in FIG. 3, no material has been removed from the male lock side 102 of the notch N, and therefore the male lock side 102 is complete end to end. As will be appreciated, by removing the necessity of forming corner notches N along the male lock side 102' (seen in prior art FIG. 2) the present invention and methodology saves both time and expense.

Secondly, the male lock side 102 and the female lock side 104 have been reversed due to the fact that the male lock side 102 will be formed into a male lock seam later in the metal forming system/apparatus 100, necessitating the need to move it to the other end of the workpiece/blank.

Figure 4:
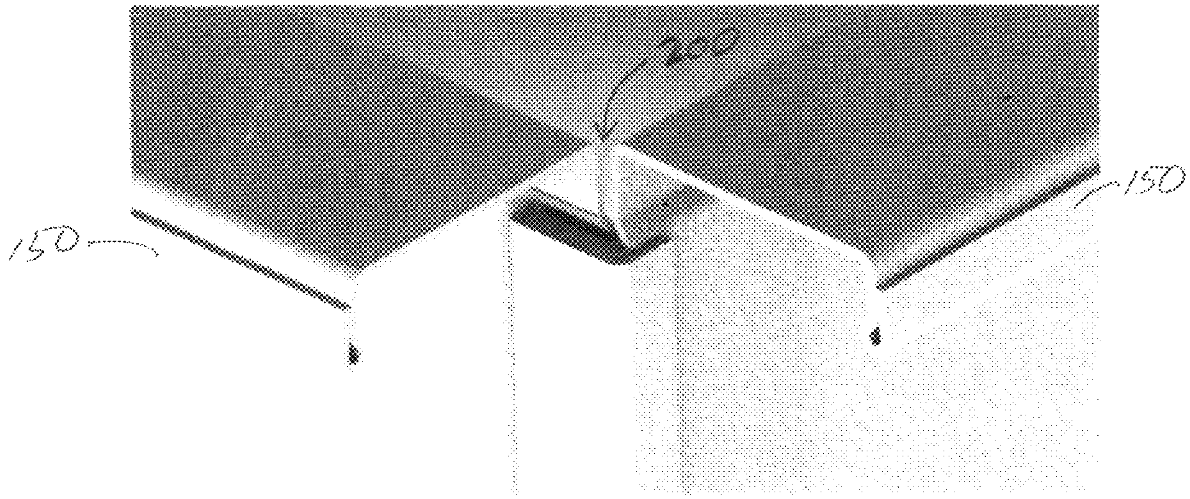
FIGURE 4 (PRIOR ART)
FIG. 4 illustrates the prior art male lock configuration.

In another aspect of the present invention, the male lock side 102 is thereafter bent to define the 90° angle of the male lock seam, but this bending is no longer formed before the rolling of the duct connecting flange 150 (best seen in FIGS. 4 and 5), as is commonly known. Instead, the bending of the male lock side 102 into a suitable male lock seam portion evidencing a 90° angle is accomplished downstream, i.e., after, the rolling of the duct connecting flange 150, as depicted in FIG. 1.

As shown in FIG. 1, the metal forming apparatus 100 includes, generally, a first portion 106 that is designed to accept and transport metal blank workpieces of various sizes and thicknesses. A second, cutting assembly portion 108 serves to cut or punch apertures in the workpiece as needed. A third portion 112 is thereafter provided to form the female lock seam.

As is typically the case in known metal forming assemblies, a male lock seam (evidencing a 90° bend angle) is commonly formed at a point 110 directly after the cutting assemblies 108, however in the present invention this male lock seam feature is produced downstream in a male lock seam forming fifth portion 116.

The present invention thus provides a metal forming apparatus 100 in which the female lock seam is defined and formed during the manufacturing process, but upstream, i.e., before, the male lock seam portion is cut or defined.

Returning to FIG. 1, a fourth, flange forming portion 114 is provided prior to the fifth, male lock seam forming portion 116.

It will be readily appreciated by one of ordinary skill that by delaying the formation of the male lock seam to a location downstream (i.e., after) the female lock seam has been cut and formed, the present invention avoids the problem of having a fully formed male lock seam potentially deformed as it passes through the connection flange roller in the fourth flange forming portion 114. The male lock will now be formed in the same location where the pieces of sheet metal are being bent 90 degrees into either a two sided "L" shaped piece or a four sided rectangular shaped piece. Due to the necessity of forming the 90° male lock in this new location, the present invention will include alterations to the equipment and to the process. The present invention equipment will now include pop-up locating pins that will positively locate the part a precise distance from the bending beam and parallel to the bending beam. The present invention process will be as follows: A part that has the female lock formed across the trailing end and connecting flanges formed on both sides will be conveyed via belts into the male lock forming station/portion 116. After passing a set of servo driven grippers, the part is gripped and driven at high speed within a small distance of the locating pins and brought to a stop. The grippers are then released and the part is conveyed into the locating pins via belt and assisted by magnetic rolls. Once the part is precisely located the grippers are once again activated, the locating pins are disengaged and the part is quickly and accurately located in the bending area where the 90° male lock is then formed. The part continues on to have the proper amount of 90° bends formed to create the finished duct. Alternatively, the grippers may be left open so that the part is moved to within a small distance of the locating pins, and the belts and magnetic roller are allowed to push the part against the locating pins.

In yet another aspect of the present invention, the female lock seam now must be rolled on the opposite end of the blank and therefore the location of the female lock rollers has been moved from one end of the part to the other-refer to FIG. 1.

The present invention, as described above, overcomes the shortcomings and limitations of air leakage in Pittsburgh duct that has been around the industry a long time. Previously, the Pittsburgh male lock seam was formed by first having to remove workpiece material from both ends (as with notches, N, shown in FIG. 2) in order to enable the part to be processed through the connecting flange rollers. This absence of metal in the corners left a small opening 200 (best seen in FIG. 4) that required manual labor to eliminate/seal.

Figure 5:
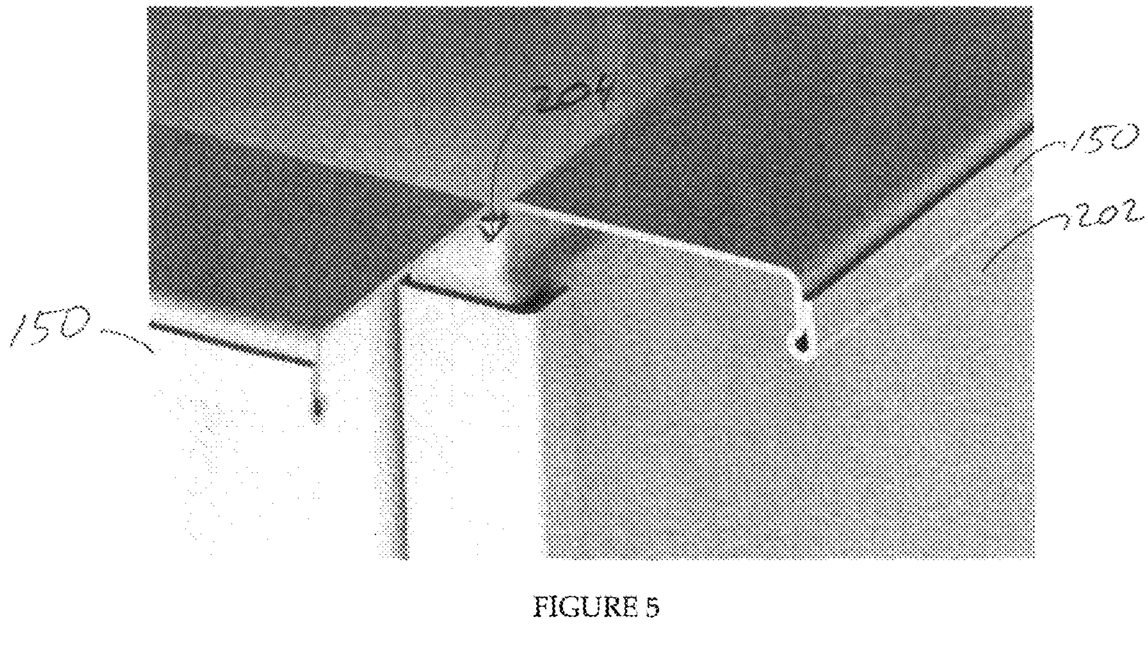
FIG. 5 illustrates a full engagement male lock configuration according to an embodiment of the present invention.

As discussed above, by essentially delaying the formation of the male lock seam to a location 116 downstream (i.e., after) the portion 112 where the female lock seam has been cut and formed, the present invention: (1) avoids the problem of having a fully formed male lock seam potentially deformed as it passes through the connection flange roller in the fourth flange forming portion 114, and (2) eliminates the inherent gap 200 caused in prior art metal bending assemblies due to the initial notching of the male lock seam that is no longer required by the present assembly and methodology. Thus, as will be appreciated, the present invention is capable of forming a full-length Pittsburgh male lock seam, and thereby eliminating the previously described opening 200, reducing manual labor and associated costs. As seen in FIG. 5, a duct 202 that is cut and formed according to the present invention includes a full-length closed seam 202 owing to the lack of any male-seam side notch N, thereby eliminating any subsequent sealing process or protocol.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A method of arranging a HVAC forming apparatus, comprising the steps of:

providing a frame portion of said HVAC forming apparatus to accept a metal workpiece;

providing a cutting portion of said HVAC forming apparatus to selectively cut a female lock seam notch in said workpiece;

providing a bending portion of said HVAC forming apparatus to selectively bend said workpiece with said female lock seam notch into a female lock seam;

providing a flange portion of said HVAC forming apparatus to selectively form duct connection flanges in said workpiece;

providing a male seam forming portion of said HVAC forming apparatus, said male seam forming portion selectively manipulating said workpiece to define a male lock seam; and positioning said male seam forming portion at a position in said metal forming apparatus that is downstream of said first portion, said second portion and said third portion; and wherein said male seam forming portion forms said male seam along one lateral edge of said workpiece without first notching said one lateral edge.

* * * * *